United States Patent
Nagasaka et al.

(10) Patent No.: US 6,601,685 B2
(45) Date of Patent: Aug. 5, 2003

(54) SHIFT DEVICE FOR VEHICLE

(75) Inventors: Chikao Nagasaka, Aichi (JP); Noriyasu Syamoto, Aichi (JP); Atsushi Mizutani, Aichi (JP); Naoki Kamiya, Aichi (JP)

(73) Assignees: Kabushiki Kaisha Tokai, Aichi (JP); Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/093,090

(22) Filed: Mar. 6, 2002

(65) Prior Publication Data

US 2002/0152828 A1 Oct. 24, 2002

(30) Foreign Application Priority Data

Mar. 6, 2001 (JP) ........................................ 2001-062249

(51) Int. Cl.[7] .............................................. F16H 59/10
(52) U.S. Cl. ..................... 192/218; 74/473.21; 180/315
(58) Field of Search ................................. 192/218, 220, 192/221, 222; 477/94, 96; 74/473.21, 473.3, 473.33, 473.34; 180/315, 316, 326, 334, 89.13; 70/208, 245, 246, 247

(56) References Cited

U.S. PATENT DOCUMENTS

| | | | |
|---|---|---|---|
| 2,239,301 A | * 4/1941 | Papst | ........................ 70/208 |
| 4,732,232 A | * 3/1988 | Miyagi et al. | ........... 74/473.33 |
| 5,617,929 A | * 4/1997 | Richardson et al. | ........ 180/326 |
| 6,253,869 B1 | * 7/2001 | Wilson et al. | .............. 180/326 |
| 6,339,325 B1 | * 1/2002 | Oda et al. | ................ 324/207.2 |

FOREIGN PATENT DOCUMENTS

JP 57-140230 A * 8/1982

* cited by examiner

*Primary Examiner*—Rodney H. Bonck
(74) *Attorney, Agent, or Firm*—Patterson, Thuente, Skaar & Christensen, P.

(57) ABSTRACT

A shift device is located on an installing portion in the passenger compartment of a vehicle for selecting the connection state of the gear train of the transmission. The shift device includes a case, manipulation body, and a first detecting member. The manipulation body is manipulated to select the connection state of the transmission. The manipulation body is arranged to be selectively projected from the case. The first detecting member detects the connection state selected by the manipulation body.

6 Claims, 8 Drawing Sheets

SHIFT DEVICE FOR VEHICLE

BACKGROUND OF THE INVENTION

The present invention relates to a shift device for a vehicle having a shift-by-wire type shift mechanism.

A typical automobile in which an automatic transmission is installed includes a shift mechanism having a shift lever. The position of the automatic transmission is determined in accordance with the manipulation of the shift lever.

A shift-by-wire type automatic transmission has been developed as such a shift mechanism. The shift-by-wire type automatic transmission electrically detects the manipulation of a shift lever and activates an actuator for switching the range of the transmission in accordance with detected signals. A manual shift valve is switched in accordance with the operation of the actuator.

A typical shift lever is arranged such that the shift lever projects from the shift mechanism. Therefore, the shift lever might be moved in a direction that a driver does not intend. Furthermore, since the shift lever is exposed in the passenger compartment, the design flexibility is restricted.

SUMMARY OF THE INVENTION

Accordingly, it is an objective of the present invention to provide a controller for a transmission of a vehicle that prevents a shift lever from being moved in a direction that a driver does not intend and that can hide the shift lever.

To achieve the above objective, an embodiment of the present invention provides a shift device for a vehicle. The shift device includes a case, a manipulation body, and a first detecting member. The manipulation body is manipulated for selecting the connection state of a transmission of a vehicle. The first detecting member detects the connection state selected by the manipulation body. The manipulation body is characterized in that the manipulation body is arranged to be selectively projected from the case.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 4.

Figure 1:
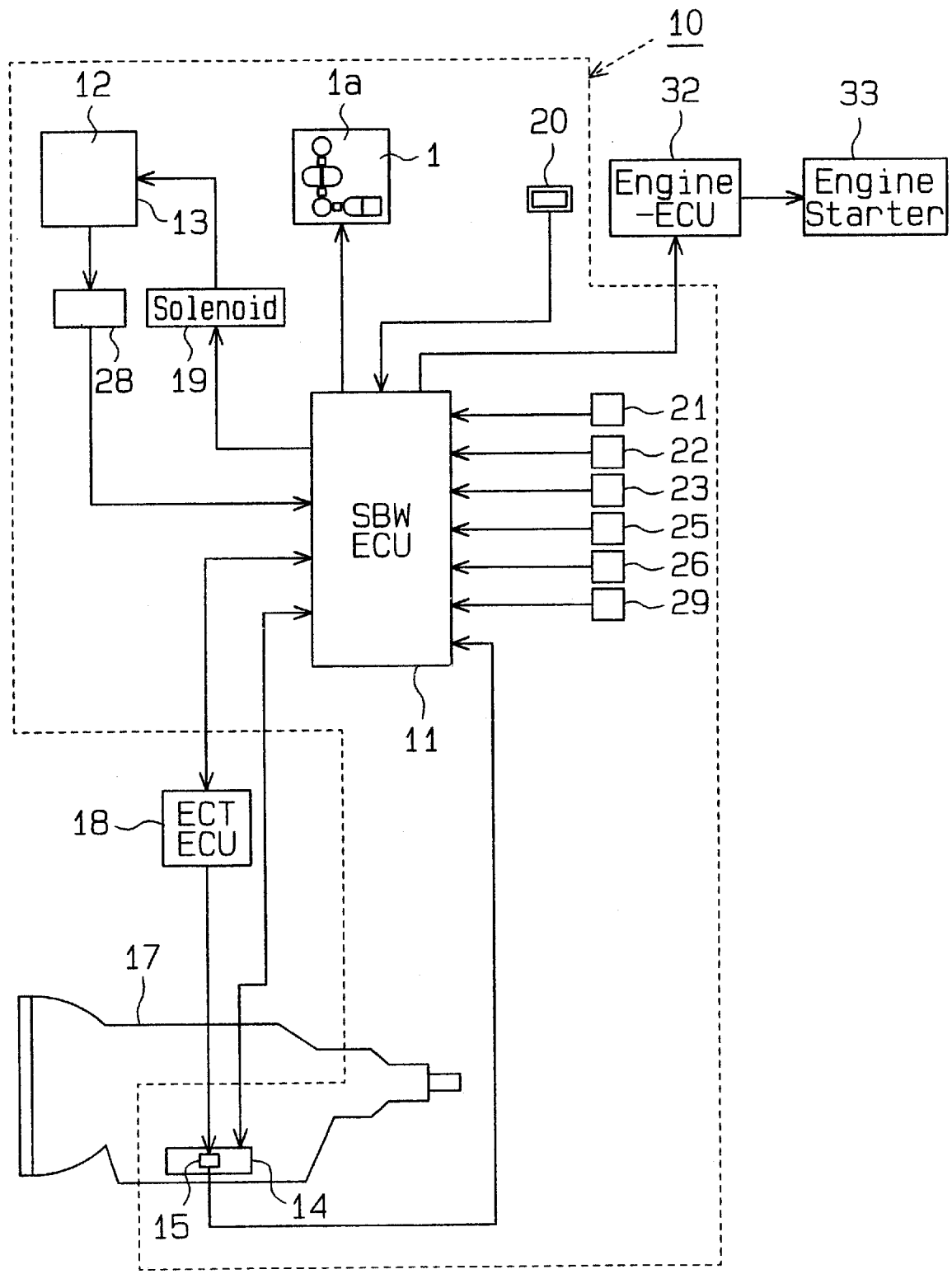
FIG. 1 is a diagram illustrating a controller of a transmission of a vehicle according to a first embodiment of the present invention.

As shown in FIG. 1, a controller 10 of a transmission of a vehicle includes an electronic control unit (SBW-ECU) 11 for controlling the transmission. The SBW-ECU 11 is electrically connected to an ECT-ECU 18, a transmission hydraulic actuator 14, a range position detection device 15, and a shift position indicator 1.

When receiving a signal from the SBW-ECU 11, the ECT-ECU 18 controls a transmission hydraulic unit in accordance with the vehicle speed and the opening degree of a throttle valve. The ECT-ECU 18 then shifts the connection state of a gear train in order. The gear train has four ranges, each having a different gear ratio. This is a well-known automatic transmission control.

The transmission hydraulic actuator 14 is electrically connected to an automatic transmission 17. The hydraulic actuator 14 includes several electromagnetic control valves (not shown), which are manipulated by electric signals. Each electromagnetic control valve adjusts the amount of hydraulic oil supplied from a hydraulic pump and shifts the connection state of the gear train of the transmission 17. The connection state of the gear train of the transmission 17 is shifted among parking (P), reverse drive (R), neutral (N), and forward drive (D).

The range position detection device 15 is located in the housing of the automatic transmission 17. The range position detection device 15 detects the connection state (P, R, N, D) of the gear train and sends a detection signal to the SBW-ECU 11. The shift position indicator 1 controls a display 1a in accordance with the signal sent from the SBW-ECU 11.

The SBW-ECU 11 includes a micro-computer (not shown). The micro-computer executes a program, which is stored in advance, so that the SBW-ECU 11 controls the hydraulic actuator 14 to shift the connection state of the gear train. The SBW-ECU 11 controls the hydraulic actuator 14 in accordance with detection signals sent from a shift mechanism 13, which will be described later, and detection signals sent from the range position detection device 15.

As shown in FIG. 1, an engine switch 20, an acceleration switch 21, and a brake switch 22 are electrically connected to the input of the SBW-ECU 11. A pedal pressure sensor 23, an engine speed sensor 25, a vehicle speed sensor 26, and an air bag sensor 29 are also electrically connected to the input of the SBW-ECU 11. The SBW-ECU 11 detects the driving state of the vehicle based on the signals from the switches 20, 21, and 22 and the sensors 23, 25, 26, and 29.

The engine switch 20 is a momentary switch for selectively starting and stopping the engine without manipulating an ignition switch. The SBW-ECU 11 is electrically connected to an engine electronic control unit (engine-ECU) 32. The engine-ECU 32 is electrically connected to an engine starter 33. The engine-ECU 32 controls the engine with a known control such as a fuel injection control and an ignition timing control. The fuel injection control is based on, for example, the opening degree of a throttle valve and the engine speed. The ignition timing control is based on the supplied gas amount and the crank position. If the engine switch 20 is switched on when the engine is not running, the engine-ECU 32 controls the engine starter 33 to start the engine. If the engine switch 20 is switched on when the engine is running, the engine-ECU 32 stops the engine.

The acceleration switch 21 sends an acceleration signal when an acceleration pedal is depressed. The brake switch 22 sends a brake signal when a brake pedal is depressed. The pedal pressure sensor 23 detects the pedal pressure applied to the acceleration pedal and sends a signal representing the detected pedal pressure. The engine speed sensor 25 detects the engine speed and sends a signal representing the detected engine speed. The vehicle speed sensor 26 detects the vehicle speed and sends a signal representing the detected vehicle speed. The air bag sensor 29 sends a detection signal when detecting collision of a vehicle in which the air bag needs to be activated.

As shown in FIG. 1, the controller 10 of the transmission of the vehicle includes the shift mechanism 13. The shift mechanism 13 includes first detecting members, which are magnetic resistance elements 28 in the first embodiment. The magnetic resistance elements 28 are electrically connected to the SBW-ECU 11. The shift mechanism 13 also includes an actuator, which is a solenoid 19, in this embodiment. When a shift lever 16 is manipulated, the SBW-ECU 11 sends an activation signal to the solenoid 19. As a result, current is supplied to the solenoid 19, thus activating the solenoid 19.

The mechanical structure of the controller 10 of the transmission of the vehicle will now be described.

Figure 2:
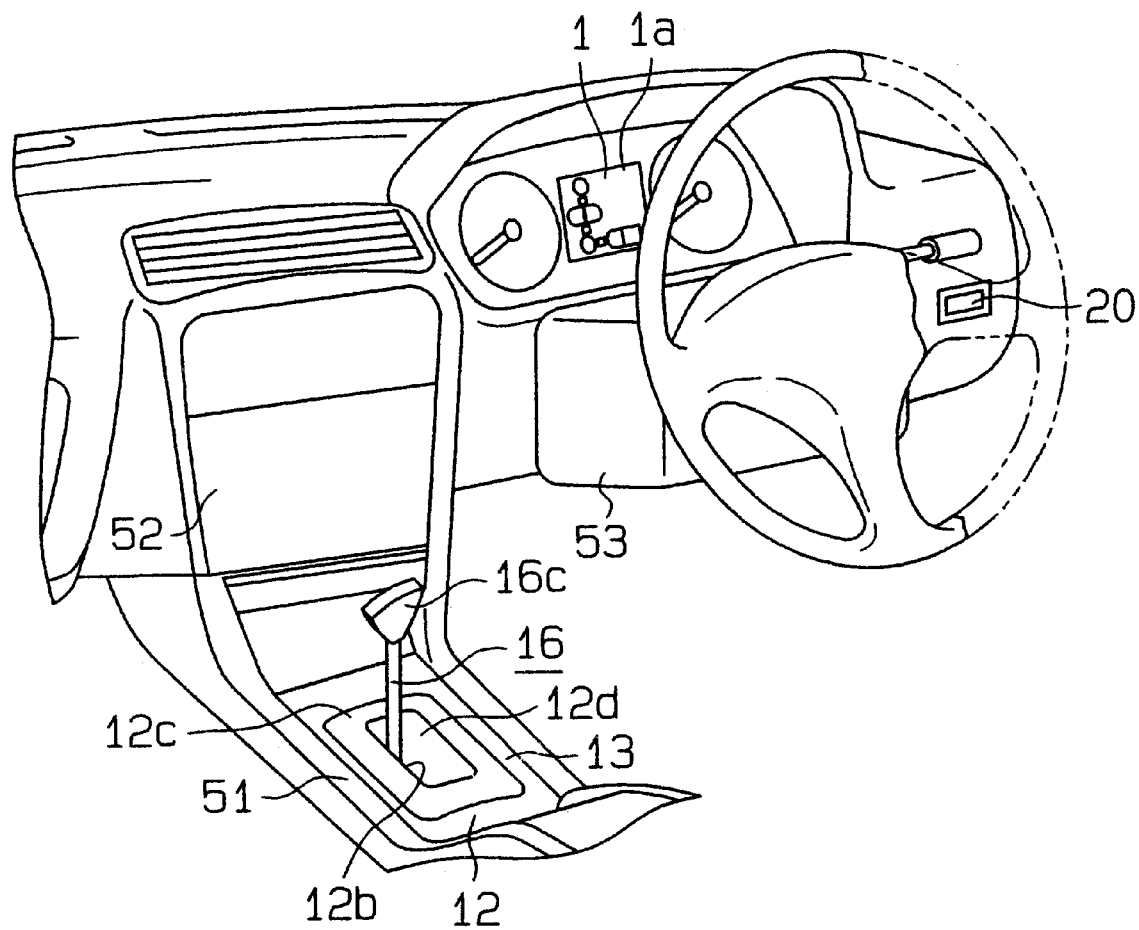
FIG. 2 is a schematic diagram illustrating a driver's seat in which the transmission of the controller shown in FIG. 1 is installed.
Figure 3:
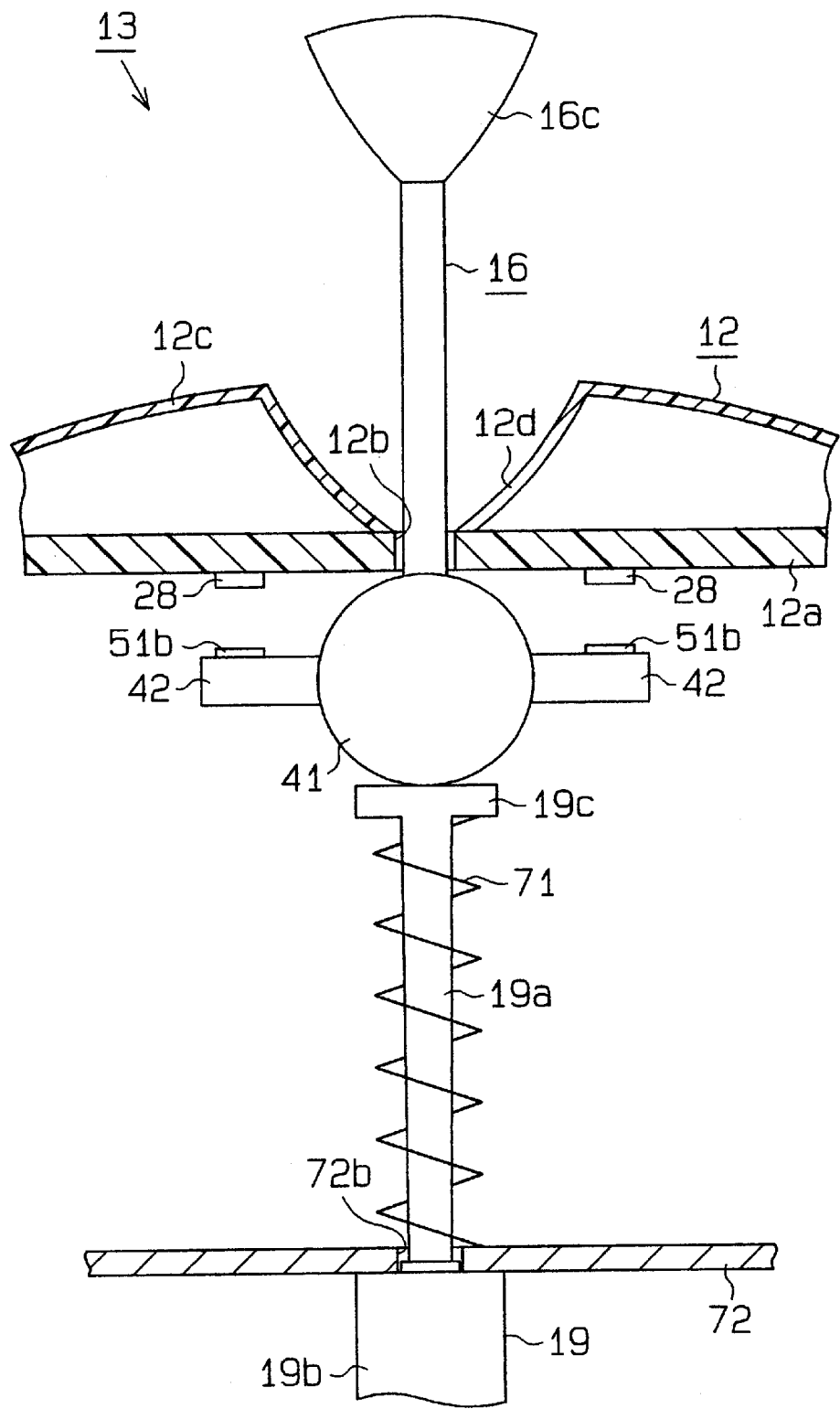
FIG. 3 is a cross-sectional view illustrating a shift mechanism being used.

As shown in FIGS. 2 and 3, the vehicle includes an installing portion, which is a floor console 51 in this embodiment. A case 12 of the shift mechanism 13 is secured to the floor console 51. The case 12 has a cover 12a, which is covered with an ornamental member 12c. The ornamental member 12c includes an accommodating portion 12d. The cover 12a has a guide hole 12b. The guide hole 12b extend in the longitudinal direction of the cover 12a.

Figure 4:
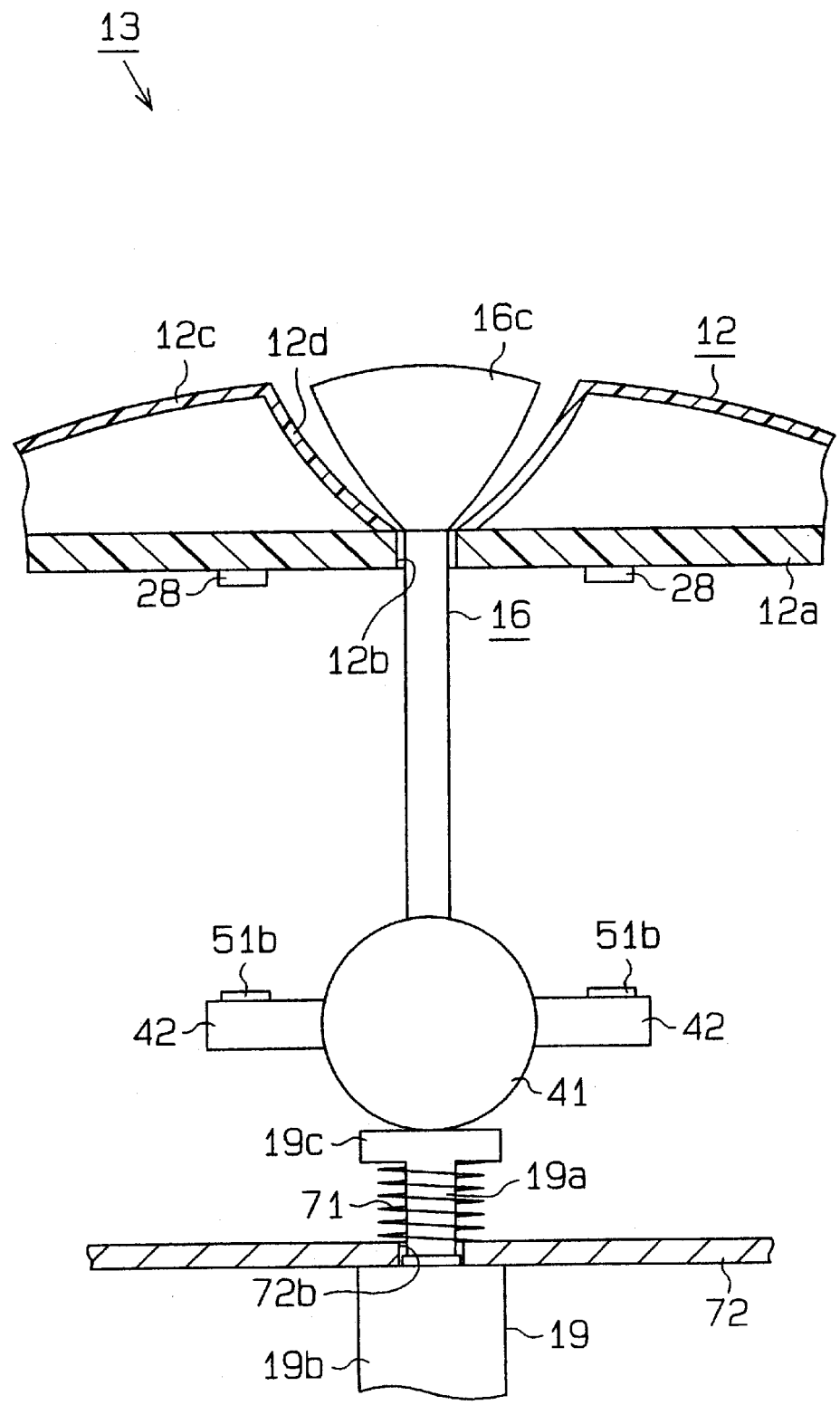
FIG. 4 is a cross-sectional view illustrating the shift mechanism not being used.

The shift mechanism 13 includes a shift lever 16. The shift lever 16 is arranged to be selectively projected from the case 12 of the shift mechanism 13. As shown in FIG. 3, the shift lever 16 projects upward through the guide hole 12b of the case 12 when the shift lever 16 is manipulated. As shown in FIG. 4, the shift lever 16 moves downward by the force of a tension spring 71, which will be described later, when the shift lever 16 is not manipulated. A shift knob 16c is attached to the distal end of the shift lever 16. A driver grasps the shift knob 16c to manipulate the shift lever 16. The shift lever 16 is tilted to shift the connection state of the gear train of the transmission 17 between selective positions P, R, N, and D.

As shown in FIG. 3, a ball 41 is located at the proximal end of the shift lever 16. The diameter of the ball 41 is greater than the width of the guide hole 12b. The diameter of the ball 41 is greater than the diameter of the shift lever 16. Two mount plates 42 laterally project from the ball 41 in the opposite directions. A magnet 51b is attached to the top surface of each mount plate 42.

The magnetic resistance elements 28 are located at several locations on the cover 12a of the shift mechanism 13. In the first embodiment, the number of the magnetic resistance elements 28 is eight, and the elements 28 work in pairs. That is, each pair of the elements 28 corresponds to one of the selective positions P, R, N, and D. The pairs of magnetic resistance elements 28 are located on the cover 12a at a predetermined interval along the longitudinal direction of the case 12. When a driver tilts the shift lever 16 to select the connection state of the gear train, the shift lever 16 moves into the selected position about the ball 41. When the shift lever 16 is moved, the magnets 51b face with the pair of magnetic resistance elements 28 that correspond to the selected shift position. As a result, the selected pair of magnetic resistance elements 28 sends a signal representing the connection state of the gear train, or a shift position detection signal, to the SBW-ECU 11.

A through hole 72b is formed in the bottom portion 72 of the shift mechanism 13. The solenoid 19 is provided below the bottom portion 72. The solenoid 19 includes a main body 19b and a plunger 19a. A depression plate 19c is located at the distal end of the plunger 19a. The depression plate 19c contacts the ball 41. An urging member, which is the tension spring 71 in the first embodiment, is located between the depression plate 19c and the bottom portion 72. The tension spring 71 urges the depression plate 19c toward a direction such that the depression plate 19c approaches the bottom portion 72. The plunger 19a extends through the through hole 72b.

When current is supplied to the solenoid 19, the plunger 19a extends upward from the main body 19b of the solenoid 19, thus causing the shift knob 16c to project from the case 12 (see FIG. 3). When current is not supplied to the solenoid 19, the plunger 19a is accommodated in the main body 19b of the solenoid 19 by the force of the tension spring 71. Thus, the shift knob 16c is accommodated in the accommodating portion 12d (see FIG. 4). The shift mechanism 13 is a stationary type mechanism. Therefore, when the shift lever 16 is shifted to any of the selective positions P, R, N, and D, the shift lever 16 is retained by a known retainer (not shown) at the selected position.

The operation of the shift mechanism 13 will now be described.

As shown in FIG. 4, the plunger 19a is accommodated in the main body 19b of the solenoid 19 before the engine is started. In this state, the top surface of the shift knob 16c is located at substantially the same level as the top surface of the ornamental member 12c. That is, the shift knob 16c is accommodated in the accommodating portion 12d. Therefore, the shift lever 16 cannot be operated.

When the brake pedal is depressed after the engine switch 20 is manipulated to start the engine, the brake switch 22 sends a brake signal to the SBW-ECU 11. At the receipt of the brake signal, the SBW-ECU 11 sends an activation signal to the solenoid 19. As a result, current is supplied to the solenoid 19, thus causing the plunger 19a to be extended upward from the main body 19b. Furthermore, as shown in FIG. 3, the shift knob 16c projects from the top surface of the ornamental member 12c. As a result, a driver can move the shift lever 16 into any of the ranges R, N, and D.

When a driver moves the shift lever 16 into one of the drive ranges (such as D range), the set of magnetic resistance elements 28 send a detection signal representing the shift position to the SBW-ECU 11. The SBW-ECU 11 sends a actuator 14 shifts the connection state of the gear train to the forward drive (D). When a driver manipulates the acceleration pedal in this state, the vehicle starts to move.

When the vehicle is running, the SBW-ECU 11 obtains the vehicle speed in accordance with vehicle speed signals sent from the vehicle speed sensor 26. When the vehicle reaches a predetermined speed, the SBW-ECU 11 stops sending activation signals to the solenoid 19. As a result, current supplied to the solenoid 19 is stopped and the plunger 19a is accommodated in the main body 19b. As a result, as shown in FIG. 4, the shift knob 16c is accommodated in the accommodating portion 19d so that the shift lever 16 cannot be manipulated.

When a driver depresses the brake pedal and the vehicle stops, the brake switch 22 sends a brake signal to the SBW-ECU 11. Then, the vehicle speed sensor 26 sends a vehicle speed signal to the SBW-ECU 11. The SBW-ECU 11 detects that the brake pedal has been depressed based on the brake signal and detects that the vehicle is stopped based on the vehicle signal. At this time, the SBW-ECU 11 sends an activation signal to the solenoid 19. This causes the shift knob 16c to project from the top surface of the ornamental member 12c. When the driver manipulates the shift lever 16 to shift the connection state of the gear train to the parking range (P) and manipulates the engine switch 20, the engine stops. When the engine stops, the SBW-ECU 11 stops sending actuation signals to the solenoid 19. As a result, the shift knob 16c is accommodated in the accommodating portion 12d.

The first embodiment provides the following advantages.
(1) The shift lever 16 is arranged to be selectively projected from the case 12 of the shift mechanism 13. Therefore, the shift lever 16 is accommodated in the case 12 when the shift lever 16 is not manipulated by the driver. Thus, when the shift lever 16 is accommodated in the case 12, less part of the shift lever 16 projects from the case 12. This prevents the shift lever 16 from being manipulated in a direction that a driver does not intend. Furthermore, when the shift lever 16 is accommodated in the case 12, the shift lever 16 does not project to the passenger compartment. Therefore, the shift lever 16 is not exposed, which improves the design flexibility.
(2) When a driver needs to manipulate the shift lever 16, the shift lever 16 projects from the case 12 by the operation of the solenoid 19. Therefore, when the shift lever 16 is manipulated, an external force can be applied to the shift lever 16. This facilitates the manipulation of the shift lever 16. When the manipulation of the shift lever 16 is not required, the shift lever 16 is accommodated in the case 12 by the force of the spring 71. Therefore, when the shift lever 16 is not manipulated, the shift lever 16 is prevented from being manipulated in a direction that a driver does not intend. While the shift lever 16 is accommodated in the case 12, the space that has been occupied by the projecting shift lever 16 can be effectively used.
(3) The ball 41, which contacts the solenoid 19, is located at the proximal end of the shift lever 16. Therefore, even when the shift lever 16 is tilted, the depression plate 19c reliably contacts the ball 41. Thus, the shift lever 16 is selectively projected from the case 12 of the shift mechanism 13 reliably. The pressure of the plunger 19a is applied to the ball 41, which has a larger diameter than that of the shift lever 16. Therefore, compared with a case when the depression plate 19c directly contacts the shift lever 16, the shift lever 16 is prevented from being affected by a force applied in a direction that a driver does not intend.
(4) Each magnet 51b is attached to the top surface of one of the mount plates 42 and the magnetic resistance elements 28 are attached to the cover 12a of the shift mechanism 13. Therefore, when the shift knob 16c projects from the case 12, the magnets 51 approach the magnetic resistance elements 28. At this time, the magnetic resistance elements 28 detect the selected state of the shift lever 16. On the other hand, when the shift knob 16c is accommodated in the accommodating portion 12d, the magnets 51b move away from the magnetic resistance elements 28. At this time, the magnetic resistance elements 28 can not detect the selected state of the shift lever 16. When the magnets 51b approaches the magnetic resistance elements 28, the magnets 51b reliably faces with one of the set of magnetic resistance elements 28 that corresponds to the selected position P, R, N, or D. Therefore, the selected state of the shift lever 16 is reliably detected by each set of magnetic resistance elements 28.

A shift mechanism 113 according to a second embodiment of the present invention will now be described with reference to FIGS. 5(a) and 5(b). The differences from the embodiment of FIGS. 1 to 4 will mainly be discussed. Like or the same reference numerals are given to those components that are like or the same as the corresponding components of the embodiment of FIGS. 1 to 4 and detailed explanations are omitted.

Figure 5A:
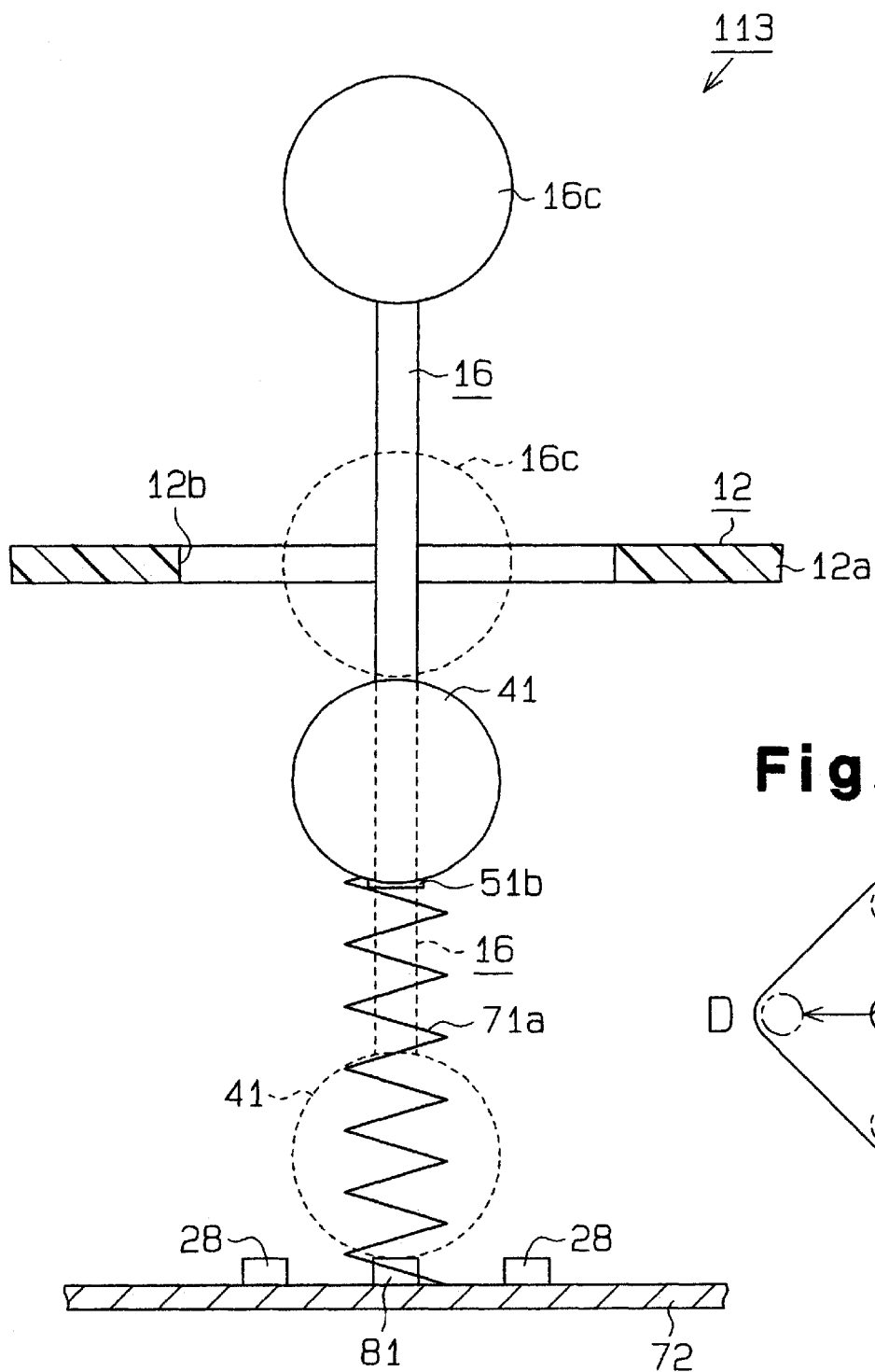
FIG. 5(a) is a schematic diagram illustrating a shift mechanism according to a second embodiment of the present invention.
Figure 5B:
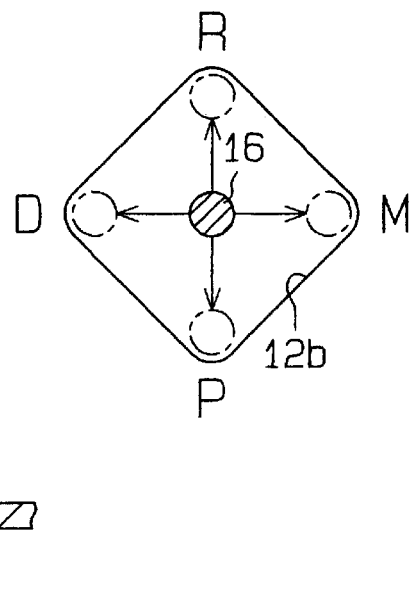
FIG. 5(b) is a plan view illustrating shift positions of the shift mechanism shown in FIG. 5(a)

As shown in FIG. 5(b), a substantially rectangular guide hole 12b is formed in the case 12. As shown in FIG. 5(a), the shift lever 16 projects upward through the guide hole 12b of the case 12 in a normal state. A driver tilts the shift lever 16 to shift the connection state of the gear train. The shift lever 16 moves downward when depressed. The diameter of the ball 41, which is located at the proximal end of the shift lever 16, is less than the width of the guide hole 12b. The magnet 51b is attached to the bottom surface of the ball 41. A spring 71a is located between the ball 41 and the bottom portion 72 of the shift mechanism 13. The spring 71a urges the ball 41 in a direction to separate the ball 41 from the bottom portion 72.

The magnetic resistance elements 28 are located on the bottom portion 72 each corresponding to one of the selective positions P, R, D, and M (four magnetic resistance elements 28 in total) in the shift mechanism 113. When a driver tilts the shift lever 16 to select the connection state of the gear train, the shift lever 16 moves to the selected position about the ball 41. When the shift lever 16 is shifted, the magnet 51b faces one of the magnetic resistance elements 28 that corresponds to the selected shift position. As a result, the selected magnetic resistance element 28 sends a signal representing the connection state of the gear train, or a shift position detection signal, to the SBW-ECU 11. A second detecting member, which is a detection switch 81 in the second embodiment, is located at the joint between the bottom portion 72 and the spring 71a. When the shift lever 16 is depressed, the ball 41 presses the detection switch 81. Then, the detection switch 81 sends a detection signal to the SBW-ECU 11. The SBW-ECU 11 validates the manipulation of the shift lever 16 based on the signal sent from the detection switch 81. As a result, the connection state of the gear train is shifted. In the second embodiment, the connection state of the gear train is shifted among parking (P), reverse drive (R), forward drive (D), and manual (M).

The shift mechanism 13 is a momentary type mechanism. That is, when the shift lever 16 is tilted toward one of the selective positions P, R, M, or D shown by double-dotted lines in FIG. 5(b) to select the connection state of the gear train, the shift lever 16 is restored to the neutral position shown by a solid line in FIG. 5(b).

As shown by the solid line in FIG. 5(a), the shift lever 16 projects upward from the top surface of the case 12 before the engine is started.

When the engine is started and the brake pedal is manipulated in this state, current is supplied to the detection switch 81. As a result, the gear train can be shifted to any of the ranges R, D, and M.

For example, when the shift lever 16 is tilted toward any of the drive ranges (such as D range) and subsequently depressed, the ball 41 presses the detection switch 81. As a result, the connection state of the gear train is shifted to the forward drive (D). When a driver manipulates the acceleration pedal in this state, the vehicle starts to move.

When the vehicle reaches a predetermined speed, the current supply to the detection switch 81 is stopped. This disables the gear train to be shifted.

When a driver depresses the brake pedal and stops the vehicle, current is supplied to the detection switch 81. This enables the gear train to be shifted. Then, the driver tilts the shift lever 16 and depresses the shift lever 16 such that the connection state of the gear train is shifted to the parking range (P). Further, if the driver manipulates the engine switch 20, the engine stops. When the engine stops, the current supply to the detection switch 81 is stopped.

The second embodiment provides the following advantages.

(4) When the connection state of the gear train is selected with the shift lever 16 and the detection switch 81 detects that the shift lever 16 is depressed, the connection state of the gear train is shifted. That is, the connection state of the gear train can be shifted by two actions. At this time, the shift lever 16 is manipulated in two different directions. Therefore, the shift mechanism 13 is reliably prevented from being manipulated in a direction that a driver does not intend.

(5) The detection switch 81 is activated by depressing the shift lever 16. Depressing the shift lever 16 is easier than pulling the shift lever 16. This facilitates the manipulation of the shift mechanism 13.

It should be apparent to those skilled in the art that the present invention may be embodied in many other specific forms without departing from the spirit or scope of the invention. Particularly, it should be understood that the invention may be embodied in the following forms.

Figure 6A:
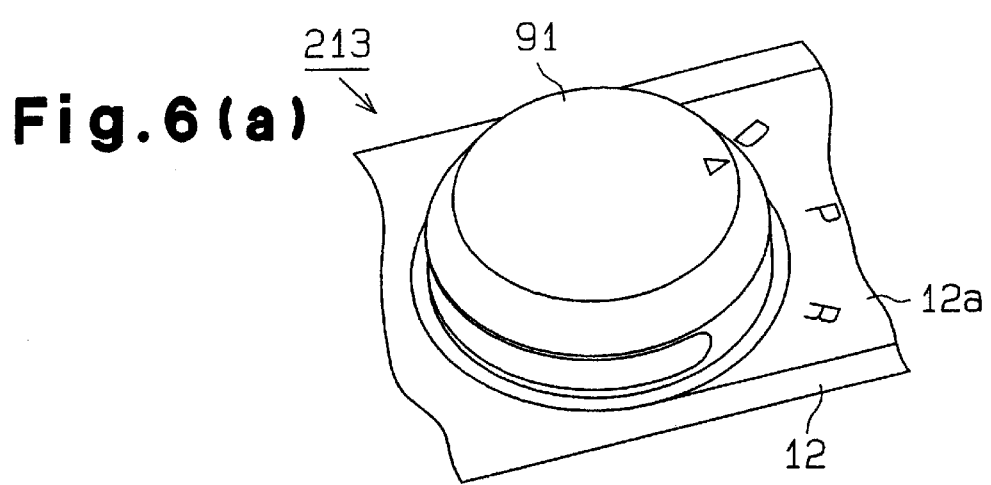
FIG. 6(a) is a perspective view illustrating a shift mechanism according to a further embodiment of the present invention.
Figure 6B:
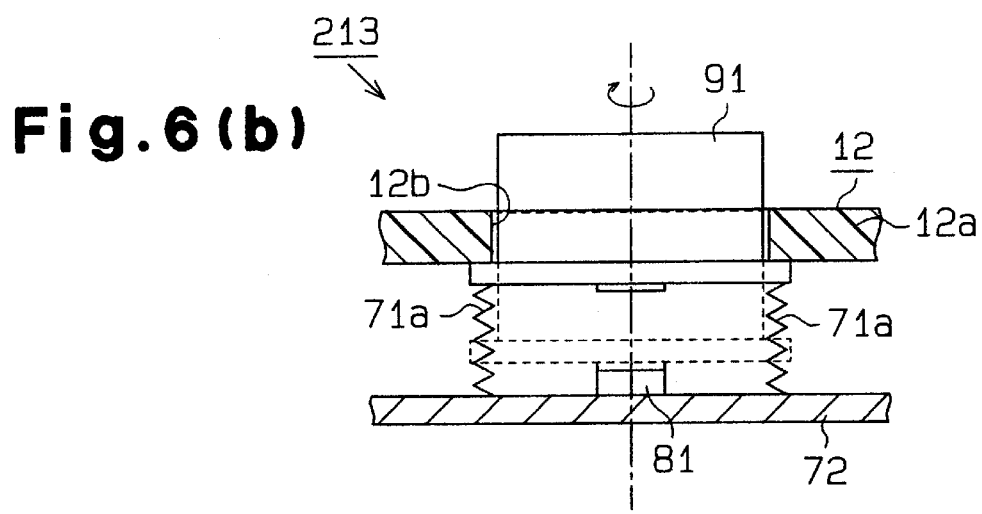
FIG. 6(b) is a cross-sectional view illustrating the shift mechanism shown in FIG. 6(a)
Figure 6C:
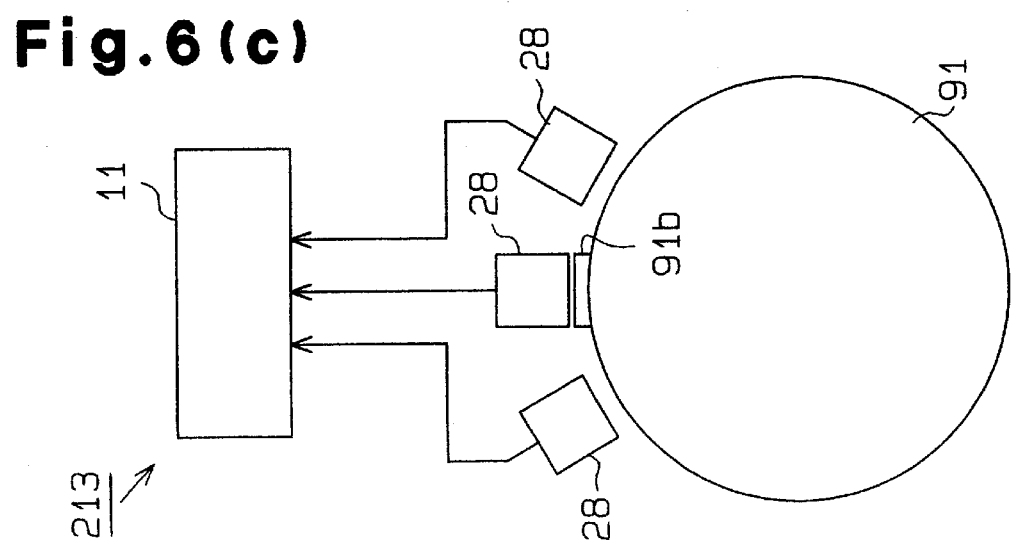
FIG. 6(c) is a circuit diagram illustrating the shift mechanism shown in FIG. 6(a)

FIGS. 6(a), 6(b), and 6(c) shows a shift mechanism 213 according to a further embodiment. According to the shift mechanism 213, a dial 91 may be used instead of the shift lever 16 shown in FIG. 1. The connection state of the gear train is shifted by first rotating and then depressing the dial 91.

Figure 7:
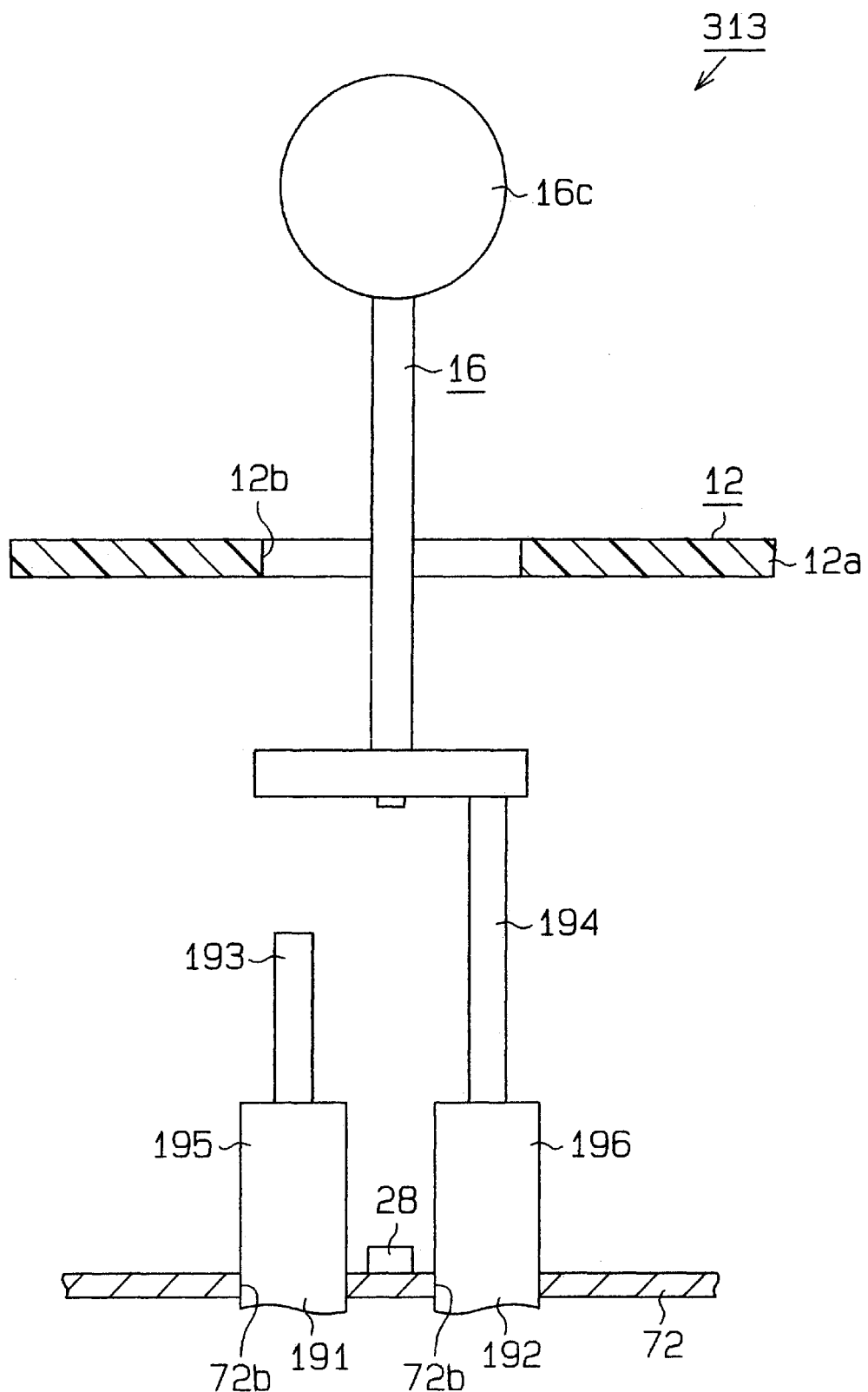
FIG. 7 is a cross-sectional view illustrating a shift mechanism according to a further embodiment of the present invention.

FIG. 7 shows a shift mechanism 313 according to a further embodiment. The shift mechanism 313 includes a first and second solenoid 191, 192. The first solenoid 191 has a plunger 193 and the second solenoid 192 has another plunger 194, each having different length. The projection amount of the shift lever 16 may be changed using the plungers 193, 194. For example, each plunger 193, 194 may be accommodated in one of first and second main bodies 195, 196 (not shown) when the shift lever 16 is depressed or before the engine is started. When the connection state of the gear train is shifted to any of P, R, N, or D, the shorter plunger 193 may extend upward from the first main body 195. When the connection state of the gear train is shifted to M, the longer plunger 194 may extend upward from the second main body 196.

Figure 8:
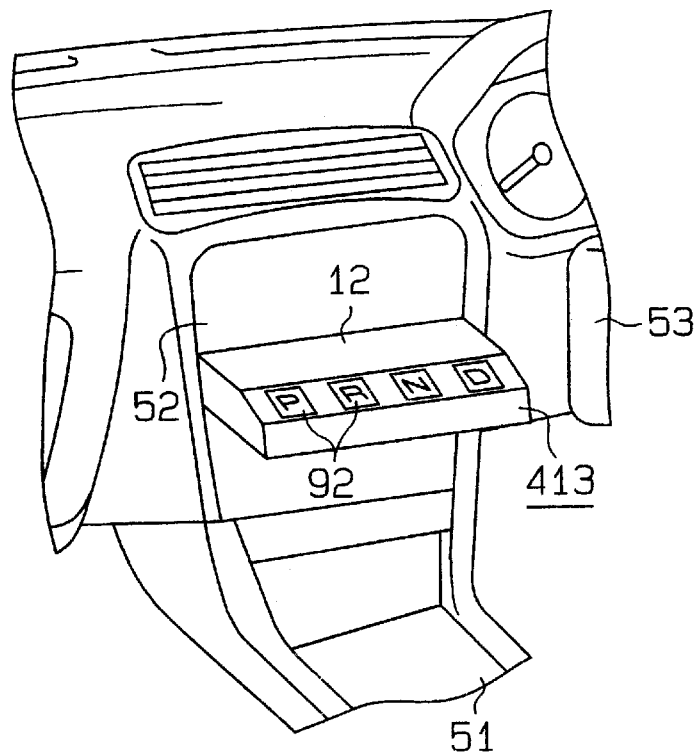
FIG. 8 is a schematic diagram illustrating a driver's seat in which a shift device according to a further embodiment is installed.

According to a further embodiment shown in FIG. 8, a shift mechanism 413 may be structured to be selectively projected from the floor console 51. In this case, a push-button 92 is located on the shift mechanism 413.

Figure 9A:
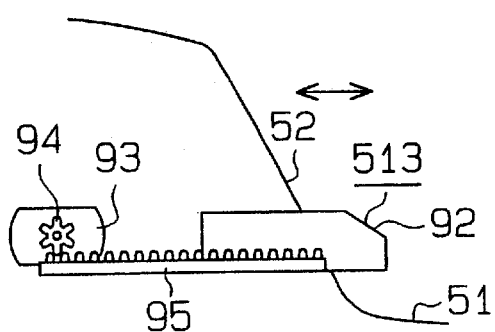
FIG. 9(a) is a schematic diagram illustrating a shift mechanism according to a further embodiment of the present invention.

According to a further embodiment of the shift mechanism shown in FIG. 9(a), a shift mechanism 513 may use a motor 93 as an actuator. The shift mechanism 513 is supported by the floor console 51 such that the shift mechanism 513 selectively extends from an instrument panel 52 by the activation of a pinion gear 94, which is attached to the motor 93, and a gear portion 95, which is located on the shift mechanism 513. Cylinders such as a pneumatic cylinder may be used as the actuator.

Figure 9B:
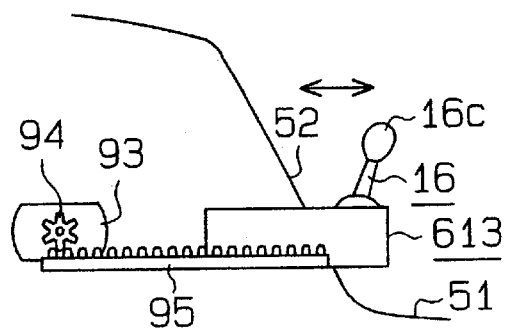
FIG. 9(b) is a schematic diagram illustrating a shift mechanism according to a further embodiment of the present invention.

According to a further embodiment shown in FIG. 9(b), a shift mechanism 613 includes a shift lever 16 having a shift knob 16c. The shift mechanism 613 is supported by the floor console 51 such that the shift mechanism 613 selectively extends from the instrument panel 52.

In the illustrated embodiments shown in FIGS. 1 to 4, the shift knob 16c may be structured to be accommodated in the accommodating portion 12d when a driver depresses the brake pedal for a predetermined period. The shift knob 16c may be structured to project from the top surface of the ornamental member 12c when a driver releases the brake pedal. Also, the shift knob 16c may be structured to project from the top surface of the ornamental member 12c when a corner sensor detects an obstacle while the shift knob 16c is accommodated in the accommodating portion 12d. Further, a sensor (not shown) may be located on a vehicle to detect a signal representing that a driver has received a ticket at a tollgate. The shift knob 16c may also be structured to be accommodated in the accommodating portion 12d based on the detected signal. The shift knob 16c may be structured to be accommodated in the accommodating portion 12d when the air bag sensor 29 detects the collision of the vehicle.

In the illustrated embodiment shown in FIGS. 5(a) and 5(b), the gear train may be structured to be shifted by tilting the shift lever 16 after depressing the shift lever 16.

In the illustrated embodiment shown in FIGS. 1 to 4, the ball 41 may be omitted and the depression plate 19c may directly contact the shift lever 16.

In the illustrated embodiments shown in FIGS. 1 to 5(b), the shift mechanism 13, 113 may be located on places other than on the floor console 51. The shift mechanism 13, 113 may be located on, for example, a column 53 or the instrument panel 52. The shift mechanism 13, 113 may be located on the compartment side of the door.

In the illustrated embodiment shown in FIGS. 5(a) and 5(b), a sensor such as a proximity sensor or a magnetic resistance sensor may be used instead of the detection switch 81.

In the illustrated embodiments shown in FIGS. 1 to 5(b), the shift knob 16c may be covered when the shift lever 16 is moved downward.

A momentary type shift mechanism 13 may be applied in the illustrated embodiment shown in FIGS. 1 to 4. Also, a stationary type shift mechanism 113 may be applied in the illustrated embodiment shown in FIGS. 5(a) and 5(b).

Therefore, the present examples and embodiments are to be considered as illustrative and not restrictive and the invention is not to be limited to the details given herein, but may be modified within the scope and equivalence of the appended claims.

What is claimed is:

1. A shift device located on an installing portion in a passenger compartment of a vehicle, wherein the shift device selects the connection state of a gear train of a transmission of the vehicle, the shift device comprising:

a case;

a manipulation body, which is manipulated for selecting the connection state of the transmission, wherein the manipulation body is arranged to be selectively projected from the case;

a first detecting member for detecting the connection state selected by the manipulation body;

a solenoid for moving the manipulation body in direction to project from the case; and a controller, wherein the controller sends an activation signal to the solenoid when the connection state of the vehicle satisfies a predetermined condition.

2. The device according to claim 1, wherein the vehicle includes a brake pedal, wherein the controller sends an activation signal to the solenoid when the brake pedal is depressed after the start of an engine in the vehicle.

3. The device according to claim 1, wherein, when the vehicle reaches a predetermined speed, the controller stops sending an activation signal to the solenoid.

4. The device according to claim 1, further comprising a ball located at the proximal end of the manipulation body, wherein the ball contacts the solenoid.

5. The device according to claim 1, further comprising:

a second detecting member for detecting when the manipulation body is depressed;

wherein the second detecting member sends a detection signal to the controller when the manipulation body is depressed, wherein the controller validates the manipulation of the manipulation body in accordance with the detection signal from the second detecting member.

6. A shift device located on an installing portion in a passenger compartment of vehicle, wherein the shift device selects the connection state of a gear train of a transmission of the vehicle, wherein the shift device includes a shift mechanism, which includes a manipulation body, a detecting member, and a solenoid, wherein the manipulation body is manipulated to select the connection state of the transmission of the vehicle, and the detecting member detects the connection state selected by the manipulation body, wherein the shift mechanism is arranged to be selectively projected from the installing portion, and wherein the solenoid moves the manipulation body in a direction to project from the installing portion.

* * * * *

UNITED STATES PATENT AND TRADEMARK OFFICE
CERTIFICATE OF CORRECTION

PATENT NO.      : 6,601,685 B2
DATED           : August 5, 2003
INVENTOR(S)     : Chikao Nagasaka et al.

It is certified that error appears in the above-identified patent and that said Letters Patent is hereby corrected as shown below:

<u>Title page,</u>
Item [73], Assignee, reads:  "Kabushiki Kaisha Tokai, Aichi (JP)
                              Rika Denki Seisakusho, Aichi (JP)"
should read:  -- Kabushiki Kaisha Tokai Rika Denki Seisakusho, Aichi JAPAN --

Signed and Sealed this

Twenty-third Day of December, 2003

JAMES E. ROGAN
*Director of the United States Patent and Trademark Office*